US010834179B2

(12) United States Patent
Qiu et al.

(10) Patent No.: US 10,834,179 B2
(45) Date of Patent: Nov. 10, 2020

(54) LOAD BALANCING (71) Applicant: TELEFONAKTIEBOLAGET LM ERICSSON (PUBL), Stockholm (SE)

(72) Inventors: Kermit Qiu, Guangzhou (CN); Gavin Ning, Guangzhou (CN); Bin Zeng, Guangzhou (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 82 days.

(21) Appl. No.: 15/562,587

(22) PCT Filed: Mar. 30, 2015

(86) PCT No.: PCT/CN2015/075358
§ 371 (c)(1),
(2) Date: Sep. 28, 2017

(87) PCT Pub. No.: WO2016/154841
PCT Pub. Date: Oct. 6, 2016

(65) Prior Publication Data
US 2018/0115601 A1 Apr. 26, 2018

(51) Int. Cl.
*H04L 29/08* (2006.01)
*H04L 12/26* (2006.01)
(Continued)

(52) U.S. Cl.
CPC ........ *H04L 67/1004* (2013.01); *H04L 43/106* (2013.01); *H04L 47/125* (2013.01); *H04L 67/42* (2013.01); *H04L 69/16* (2013.01)

(58) Field of Classification Search
CPC ... H04L 67/1002; H04L 47/125; H04L 69/22; H04L 67/1004; H04L 67/1023;
(Continued)

(56) References Cited

U.S. PATENT DOCUMENTS 6,691,165 B1 * 2/2004 Bruck ............... H04L 29/12009
709/227
2004/0090966 A1 * 5/2004 Thomas .................. H04L 29/06
370/395.52
(Continued)

FOREIGN PATENT DOCUMENTS

CN 103155500 A 6/2013
WO 2003010677 A1 2/2003
(Continued)

OTHER PUBLICATIONS

International Search Report and Written Opinion issued in Application No. PCT/CN2015/075358 dated Jan. 12, 2016, 7 pages.
(Continued)

*Primary Examiner* — Tonia L Dollinger
*Assistant Examiner* — Linh T. Nguyen
(74) *Attorney, Agent, or Firm* — Rothwell, Figg, Ernst & Manbeck, P.C.

(57) ABSTRACT

There is provided a method of performing load balancing in a communications network comprising a plurality of traffic servers. The method comprises: in a load balancer, receiving a connection request in a communications protocol from a client device and in the load balancer, selecting a traffic server for the requested connection. An identity of the selected traffic server is encoded into a protocol message header. The protocol message header is returned containing the encoded identity of the selected traffic server to the client device. The protocol message header containing the encoded identity of the selected traffic server is included in communications protocol packets sent from the client device to the load balancer. The load balancer, forwards communications protocol packets sent from the client device to the selected traffic server.

11 Claims, 8 Drawing Sheets

(51) Int. Cl.
*H04L 29/06* (2006.01)
*H04L 12/803* (2013.01)

(58) Field of Classification Search
CPC .............. H04L 43/106; H04L 29/08252; H04L 29/08279; H04L 47/193; H04L 69/163; H04L 1/0041; H04L 1/0045; H04L 63/0428; H04L 9/0643; H04L 69/16; H04L 45/7453; H04L 49/3009; H04W 12/08; H04W 8/005; H04W 72/042; H04W 72/0406; H04W 72/1284; H04W 72/1289; H04W 74/006; H04W 76/10
USPC ............... 709/238, 203, 217, 219, 224, 245; 370/392
See application file for complete search history.

(56) References Cited

U.S. PATENT DOCUMENTS

2004/0165538 A1* 8/2004 Swami ................ H04L 12/5602 370/252
2007/0258458 A1* 11/2007 Kapoor ................ H04L 1/0079 370/394
2009/0011705 A1* 1/2009 Taori ...................... H04B 7/155 455/39
2012/0246637 A1 9/2012 Kreeger et al.
2014/0330976 A1* 11/2014 van Bemmel ...... H04L 67/1023 709/226
2014/0330977 A1* 11/2014 van Bemmel .......... H04L 69/22 709/226
2014/0330982 A1* 11/2014 Jalan .................. H04L 63/0892 709/229
2016/0283312 A1* 9/2016 Murrin ..................... G06F 11/70
2017/0302360 A1* 10/2017 Aminaka .............. H04W 88/04

FOREIGN PATENT DOCUMENTS

| WO | 2003017123 | A1 | 2/2003 |
| WO | 2006074977 | A1 | 7/2006 |
| WO | 2008112864 | A1 | 9/2008 |
| WO | 2014194423 | A1 | 12/2014 |

OTHER PUBLICATIONS

The European Office Communication issued in Application No. 15886828.1 dated Jan. 24, 2018, 11 pages.
European Office Action issued in Application No. 15886828.1 dated Aug. 24, 2018, 8 pages.

* cited by examiner

LOAD BALANCING

CROSS REFERENCE TO RELATED APPLICATION(S)

This application is a 35 U.S.C. § 371 National Stage of International Patent Application No. PCT/CN2015/075358, filed Mar. 30, 2015, designating the United States, the disclosure of which is incorporated by reference.

TECHNICAL FIELD

This invention relates to performing load balancing in a communications network comprising a plurality of traffic servers.

BACKGROUND

Load balancing is a fundamental function used in communications networks that comprise a plurality of traffic servers, such as cloud-based systems. As the cloud grows it is useful not only to support stateless load balancing, where an algorithm (such as a hashtag algorithm) is used to direct a particular client to a particular server, but also to support stateful load balancing where each session is assigned to a particular server.

Stateful load balancing may be used during the dynamic increase or decrease of the number of traffic servers available in the cloud. In this case, the load balancer will continue to direct traffic to the servers until they are closed, and will start directing traffic to severs when connections become available.

Another typical use of stateful load balancing is for overload protection. If a specific traffic server is overloaded, stateful load balancing can be used to redirect any new traffic connections to other available traffic servers.

SUMMARY

According to the present invention there is provided a method of performing load balancing in a communications network comprising a plurality of traffic servers. The method comprises: in a load balancer, receiving a connection request in a communications protocol from a client device and in the load balancer, selecting a traffic server for the requested connection. The method further comprises encoding an identity of the selected traffic server into a protocol message header. The protocol message header is returned containing the encoded identity of the selected traffic server to the client device. The protocol message header containing the encoded identity of the selected traffic server is included in communications protocol packets sent from the client device to the load balancer. The load balancer, forwards communications protocol packets sent from the client device to the selected traffic server.

In some embodiments, the communications protocol may the Transmission Control Protocol.

The encoding of the identity of the selected traffic server into the protocol message header may comprise encoding the identity of the selected traffic server into bits of the Transmission Control Protocol header reserved for carrying a time stamp value.

In some embodiments, the encoding of the identity of the selected traffic server into bits of the Transmission Control Protocol header reserved for carrying a time stamp value comprises carrying least significant bits of a time stamp value in bits of the Transmission Control Protocol header reserved for carrying most significant bits of the time stamp value. It may also further comprise carrying a value identifying the selected traffic server in bits of the Transmission Control Protocol header reserved for carrying least significant bits of the time stamp value.

According to another aspect of the invention there is provided a method, for use in a load balancer of a communications network comprising a plurality of traffic servers, the method comprising: receiving a connection request in a communications protocol from a client device. On determining that the connection request relates to a new connection, selecting a traffic server for the requested connection. The method comprises receiving a communications protocol packet from the client device. On determining that the connection request relates to an existing connection, the method comprises decoding an identity of a selected traffic server from a protocol message header of the received communications protocol packet. The method comprises forwarding the communications protocol packet to the selected traffic server having the decoded identity.

In some embodiments the communications protocol is the Transmission Control Protocol.

The decoding of the identity of the selected traffic server from the protocol message header may comprise decoding the identity of the selected traffic server from bits of the Transmission Control Protocol header reserved for carrying a time stamp value.

The decoding of the identity of the selected traffic server from bits of the Transmission Control Protocol header reserved for carrying a time stamp value may comprise reading a value identifying the selected traffic server in bits of the Transmission Control Protocol header reserved for carrying least significant bits of the time stamp value.

According to another aspect of the invention there is provided a method, associated with a traffic server of a communications network comprising a plurality of traffic servers, the method comprising: receiving from a load balancer a connection request in a communications protocol originating from a client device. The method comprises encoding an identity of said traffic server into a protocol message header; and returning the protocol message header containing the encoded identity of the traffic server to the client device. The method further comprises receiving from the load balancer further communications protocol packets sent from the client device including the protocol message header containing the encoded identity of the traffic server.

In some embodiments, the communications protocol is the Transmission Control Protocol.

The encoding of the identity of the selected traffic server into the protocol message header may comprise encoding the identity of the selected traffic server into bits of the Transmission Control Protocol header reserved for carrying a time stamp value.

The encoding of the identity of the selected traffic server into bits of the Transmission Control Protocol header reserved for carrying a time stamp value may comprise carrying least significant bits of a time stamp value in bits of the Transmission Control Protocol header reserved for carrying most significant bits of the time stamp value, and carrying a value identifying the selected traffic server in bits of the Transmission Control Protocol header reserved for carrying least significant bits of the time stamp value.

In some embodiments the method further comprises restoring an original value of the protocol message header to remove the encoded identity of the traffic server before forwarding said further communications protocol packets to a destination.

According to another aspect of the invention there is provided a communications network comprising a plurality of traffic servers, the network comprising a load balancer adapted to: receive a connection request in a communications protocol from a client device; and select a traffic server for the requested connection. The plurality of traffic servers are adapted to: encode an identity of the selected traffic server into a protocol message header; and return the protocol message header containing the encoded identity of the selected traffic server to the client device. The client devices are adapted to include the protocol message header containing the encoded identity of the selected traffic server in communications protocol packets sent from the client device to the load balancer. The load balancer is further adapted to forward communications protocol packets sent from the client device to the selected traffic server.

In some embodiments, the communications protocol is the Transmission Control Protocol.

In some embodiments, the plurality of traffic servers are further adapted to encode the identity of the selected traffic server into bits of the Transmission Control Protocol header reserved for carrying a time stamp value.

In some embodiments, the plurality of traffic servers are further adapted to encode the identity of the selected traffic server into bits of the Transmission Control Protocol header reserved for carrying a time stamp value by carrying least significant bits of a time stamp value in bits of the Transmission Control Protocol header reserved for carrying most significant bits of the time stamp value, and carrying a value identifying the selected traffic server in bits of the Transmission Control Protocol header reserved for carrying least significant bits of the time stamp value.

According to an aspect of the present invention there is provided a load balancer for use in a communications network comprising a plurality of traffic servers, the load balancer being adapted to: receive a connection request in a communications protocol from a client device. The load balancer will determine whether the connection request relates to a new connection, and if so select a traffic server for the requested connection. The load balancer is further adapted to receive a communications protocol packet from the client device. The load balancer will determine whether the connection request relates to an existing connection, and if so decode an identity of a selected traffic server from a protocol message header of the received communications protocol packet. The load balancer is adapted to forward the communications protocol packet to the selected traffic server having the decoded identity.

The communications protocol may be the Transmission Control Protocol.

In some embodiments, to decode the identity of the selected traffic server from the protocol message header the load balancer is adapted to decode the identity of the selected traffic server from bits of the Transmission Control Protocol header reserved for carrying a time stamp value.

To decode the identity of the selected traffic server from bits of the Transmission Control Protocol header reserved for carrying a time stamp value, the load balancer may be adapted to read a value identifying the selected traffic server in bits of the Transmission Control Protocol header reserved for carrying least significant bits of the time stamp value.

According to another aspect of the invention there is provided a traffic server of a communications network comprising a plurality of traffic servers, wherein the traffic server is adapted to: receive from a load balancer a connection request in a communications protocol originating from a client device. The traffic server is adapted to encode an identity of said traffic server into a protocol message header. The traffic server is adapted to return the protocol message header containing the encoded identity of the traffic server to the client device; and receive from the load balancer further communications protocol packets sent from the client device which include the protocol message header containing the encoded identity of the traffic server.

The communications protocol may be the Transmission Control Protocol.

In some embodiments, to encode the identity of the selected traffic server into the protocol message header, the traffic server is further adapted to encode the identity of the selected traffic server into bits of the Transmission Control Protocol header reserved for carrying a time stamp value.

In some embodiments, to encode the identity of the selected traffic server into bits of the Transmission Control Protocol header reserved for carrying a time stamp value, the traffic sever is further adapted to carry least significant bits of a time stamp value in bits of the Transmission Control Protocol header reserved for carrying most significant bits of the time stamp value, and carry a value identifying the selected traffic server in bits of the Transmission Control Protocol header reserved for carrying least significant bits of the time stamp value.

The traffic server may be further adapted to restore an original value of the protocol message header to remove the encoded identity of the traffic server before forwarding said further communications protocol packets to a destination.

According to another aspect of the invention there is provided a load balancer for use in a communications network comprising a plurality of traffic servers, the load balancer comprising: a communications module for receiving a connection request in a communications protocol from a client device and for receiving a communications protocol packet from the client device. The load balancer further comprises a determination module for determining whether the connection request relates to a new connection and for determining whether the connection request relates to an existing connection. The load balancer further comprises a selection module for selecting a traffic server for the requested connection if it is determined that the connection request related to a new connection. The load balancer further comprises a decoding module for, if it is determined that the connection request relates to an existing connection, decoding an identity of a selected traffic server from a protocol message header of the received communications protocol packet. The load balancer further comprises a forwarding module for forwarding the communications protocol packet to the selected traffic server having the decoded identity.

According to another aspect of the invention there is provided a traffic server for use in a communications network comprising a plurality of traffic servers, the traffic server comprising: a communications module for receiving from a load balancer a connection request in a communications protocol originating from a client device and for receiving from the load balancer further communications protocol packets sent from the client device including a protocol message header containing an encoded identity of a traffic server. The traffic server further comprises an encoding module for encoding an identity of said traffic server into a protocol message header. The traffic server further comprises a response module for returning the protocol message header containing the encoded identity of the traffic server to the client device.

According to another aspect of the invention there is provided a computer-program product comprising machine-readable code containing instructions for causing a load balancer of a communications network comprising a plurality of traffic servers, to perform a method comprising: receiving a connection request in a communications protocol from a client device. On determining that the connection request relates to a new connection, the method comprises selecting a traffic server for the requested connection. The method comprises receiving a communications protocol packet from the client device. On determining that the connection request relates to an existing connection, the method comprises decoding an identity of a selected traffic server from a protocol message header of the received communications protocol packet; and forwarding the communications protocol packet to the selected traffic server having the decoded identity.

According to a further aspect of the invention there is provided a computer-program product comprising machine-readable code containing instructions for causing a traffic server of a communications network comprising a plurality of traffic servers, to perform a method comprising: receiving from a load balancer a connection request in a communications protocol originating from a client device. The method comprises encoding an identity of said traffic server into a protocol message header. The method further comprises returning the protocol message header containing the encoded identity of the traffic server to the client device. The method further comprises receiving from the load balancer further communications protocol packets sent from the client device including the protocol message header containing the encoded identity of the traffic server.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Embodiments of the present invention relate to the use of stateful load balancing and the encoding of a Traffic Server Identity into received packets in a Traffic Server.

Figure 1:
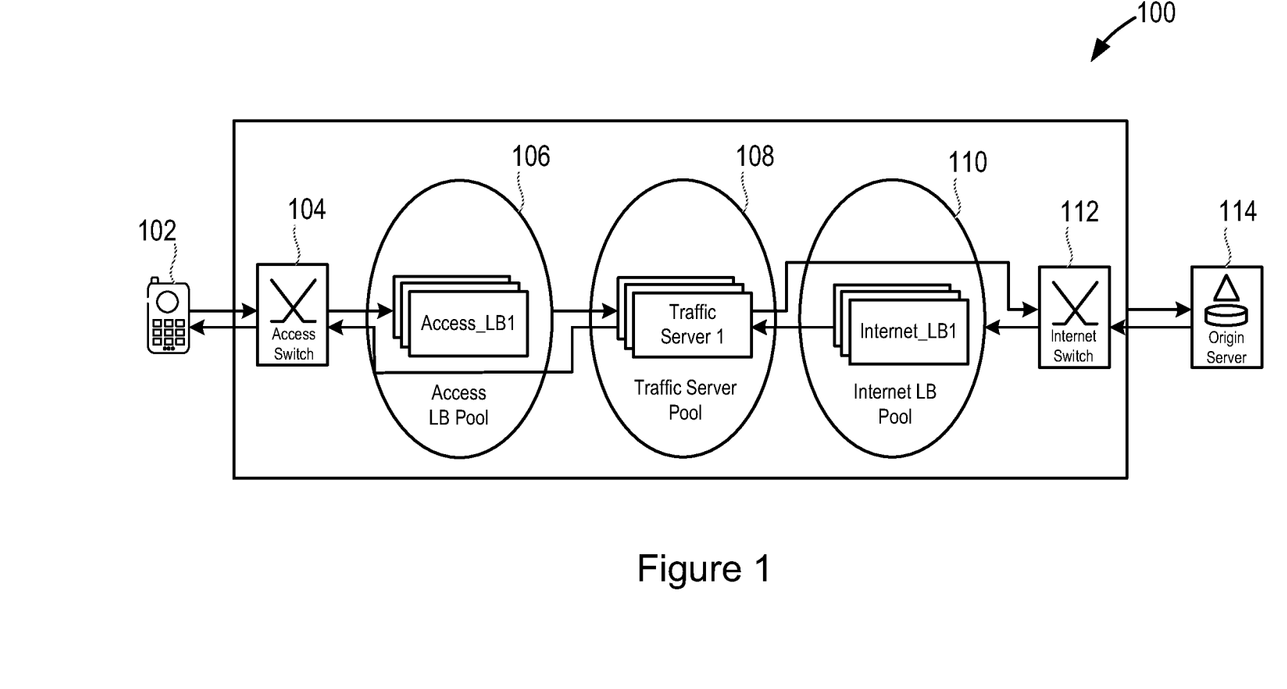
FIG. 1 shows an embodiment of a communications network.

FIG. 1 shows a communications network generally indicated 100 according to some embodiments of the invention.

A client device, which in this illustrated example is a user equipment 102, is connected to an access switch 104 of the communications network 100. The access switch 104 is adapted to forward requests from the user equipment 102 to a load balancer in an access load balancer pool 106 (Access LB Pool) which may comprise a plurality of load balancers, for example the illustrated load balancer Access_LB1. Different requests sent by the user equipment 102 may be sent to different load balancers within this pool. The requests may be in any communications protocol. In some embodiments, the communications protocol may be a Transmission Control Protocol (TCP)

The load balancers within the access load balancer pool 106 are further connected to a plurality of traffic servers within the pool of traffic servers (Traffic Server Pool) 108. The access load balancers can forward the user requests to one of these plurality of traffic servers. These traffic servers may also connect back to the access switch 104.

A second pool of load balancers, namely an internet load balancer pool (Internet LB Pool) 110, is connected to the traffic server pool 108 and further connected to an Internet side access switch (Internet Switch) 112. The Internet access switch 112 is also configured to receive requests from the traffic server pool 108.

The Internet side access switch is further connected to an origin server 114. The origin server 114 may be provided, for example, in a large-scale provider of services over the Internet, such as Google or Facebook or any other provider of services.

This illustrated example shows a cloud-based system, in which there are pools of load balancers and traffic servers, with the numbers of load balancers and traffic servers being subject to change.

Figure 2:
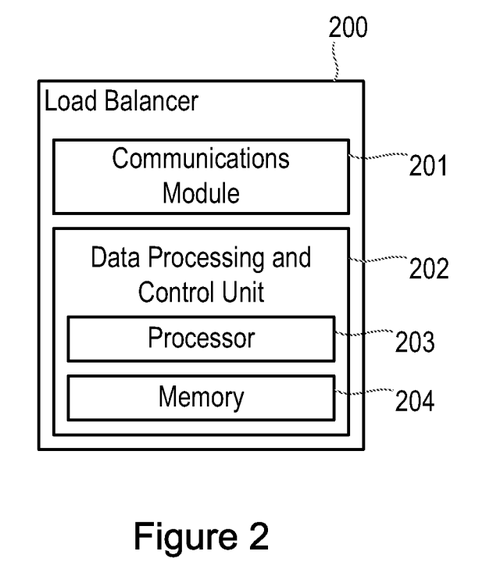
FIG. 2 illustrates an example of a Load Balancer in the network of FIG. 1.

FIG. 2 illustrates an example of a load balancer generally indicated 200 according to an embodiment of the invention. Any or all of the load balancers in the load balancer pools 106 and 110 shown in FIG. 1 may have this structure. In this embodiment the load balancer 200 comprises a communications module 201 and a data processing and control unit 202. The communications module 201 handles communications with other network nodes in the intended communications protocol(s). For example, the load balancer may be required to communicate with other network nodes over the Internet using the Transmission Control Protocol (TCP).

The data processing and control unit 202 comprises a processor 203 and a memory block 204.

The data processing and control unit 202 allows the load balancer 200 to perform the functions required for its operation, including the functions described herein. For example, the memory block 204 may contain stored program instructions for causing the processor 203 to perform the methods described herein.

Figure 3:
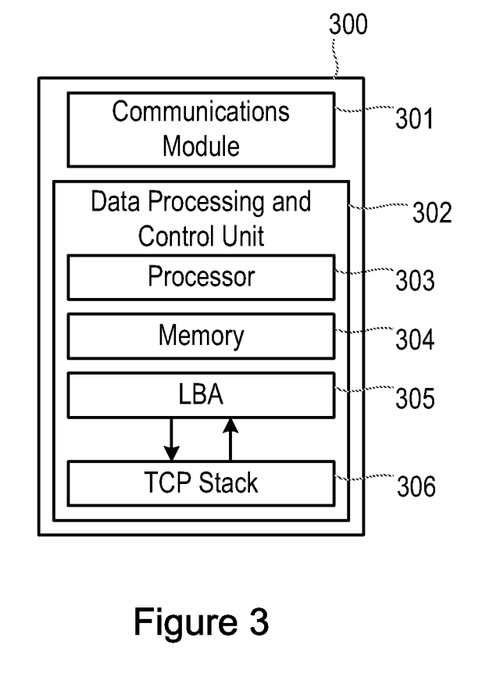
FIG. 3 illustrates an example of a Traffic Server in the network of FIG. 1.

FIG. 3 illustrates an example of a traffic server generally indicated 300 according to embodiments of the invention. Any or all of the traffic servers in the traffic server pool 108 illustrated in FIG. 1 may have this structure. In this embodiment the traffic server 300 comprises a communications module 301 and a data processing and control unit 302. The communications module 301 handles communications with other network nodes in the intended communications protocol(s). For example, the traffic server may be required to communicate with other network nodes over the Internet using the Transmission Control Protocol (TCP).

The data processing and control unit 302 comprises a processor 303 and a memory block 304.

The data processing and control unit 302 allows traffic server 300 to perform the functions required for its operation, including the functions described herein. For example, the memory block 304 may contain stored program instructions for causing the processor 303 to perform the methods described herein.

In this example, the traffic server also comprises a dedicated load balancer agent (LBA) 305 which is in communication with the TCP stack 306 within the traffic server 300. The load balancer agent 305 is therefore associated with the traffic server. In this illustrated example, the load balancer agent is co-located with the same virtual machine as the traffic server.

Figure 4:
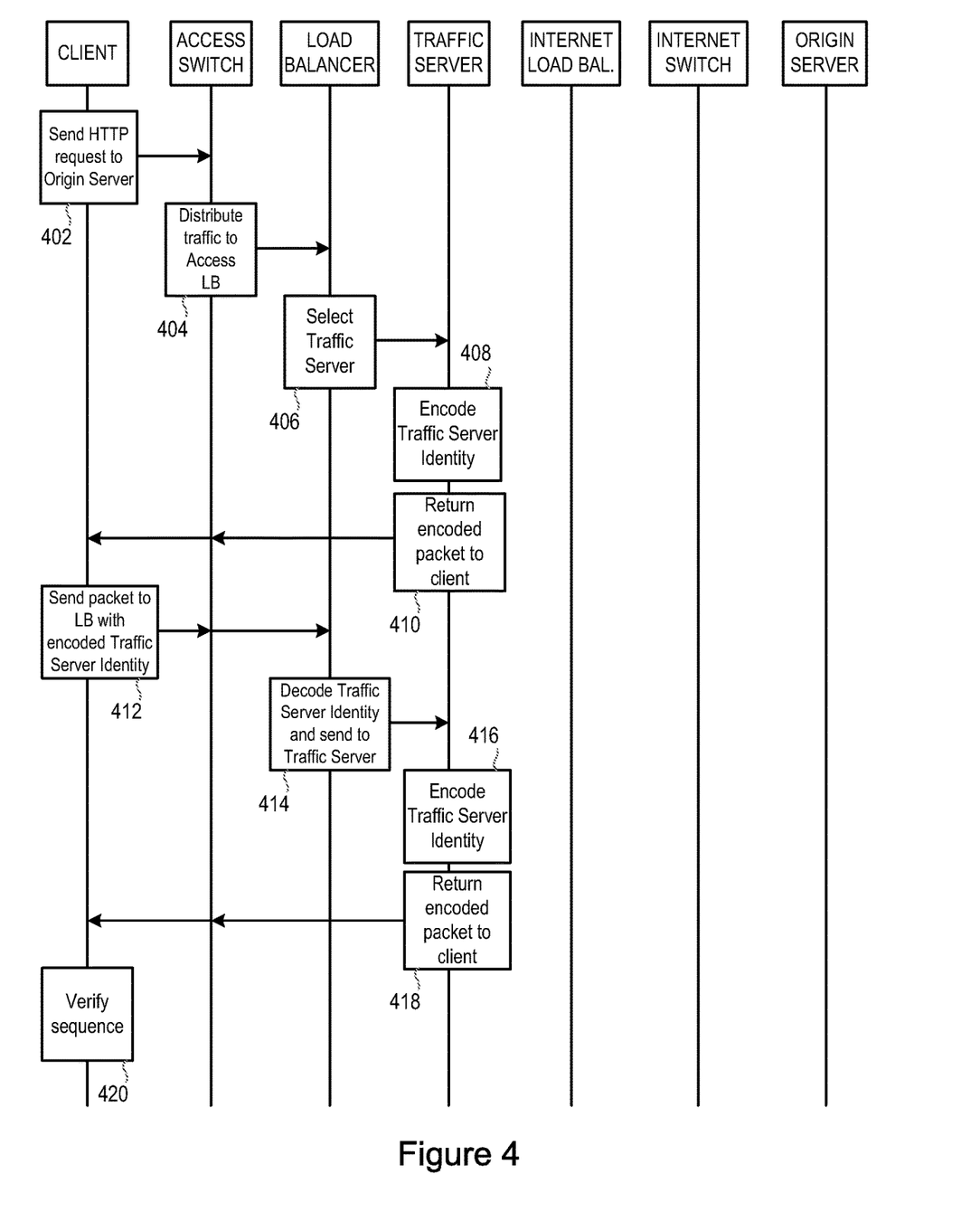
FIG. 4 illustrates a signalling diagram according to an embodiment of the invention.

FIG. 4 illustrates a signalling diagram according to an embodiment of the invention.

Firstly the client (for example the user equipment 102 in FIG. 1) creates a TCP connection and sends a Hypertext Transfer Protocol (HTTP) request to the origin server in step 402. This request is processed first by the access switch (for example the access switch 104 in FIG. 1) which distributes the traffic to an access load balancer in step 404 using an Equal Cost Multi-Path (ECMP) algorithm. The access load balancer then determines whether or not the request is for a new TCP connection. If the request is for a new TCP connection the access load balancer uses stateless load balancing to select a traffic server in step 406.

In some embodiments the stateless load balancing in step 406 may involve using a hashtag algorithm on the source port of the HTTP request and the IP address to select a traffic server. The access load balancer Module may include a dedicated virtual machine for performing this stateless traffic distribution to the traffic servers.

In step 408 the selected traffic server encodes information identifying the traffic server into the packet. This process is described in more detail with reference to FIG. 6. In step 410 the traffic server returns its response to the HTTP request, with the encoded traffic server identity, to the client, without passing through the access load balancer. This response also includes a time stamp value that can be read by the client.

In step 412 the client sends a further packet, which includes the encoded traffic server identity. This packet is sent by the access switch to an access load balancer. By using ECMP the access switch will select the same access load balancer for the same TCP connection. A new TCP connection may be forwarded to a different load balancer.

The access load balancer will again determine whether or not the request is for a new TCP connection. In this case, the TCP connection has already been created and hence, in step 414, the load balancer can determine the traffic server identity from the received packet and send the packet on to the correct traffic server, namely the same traffic server that was selected in step 406.

However, if for example, the specific load balancer which was selected by ECMP in the first step 404 has been removed, for example due to maintenance, the access switch will be aware of this change and will therefore send the traffic to a different load balancer. Again, this different load balancer will be selected using ECMP. Since the traffic server identity is encoded into the packet, this different load balancer is still able to send the packet on to the correct traffic server, namely the same traffic sever that was selected in step 406

In step 416 the traffic server repeats the encoding of the traffic server identity, again as described in more detail with reference to FIG. 6. In Step 418 the traffic server returns the encoded packet to the client. This returned packet also includes a time stamp value that can be read by the client and, in step 420 the client verifies that this time stamp is monotonically increased from the previously read time stamp.

In some embodiments, the encoding of the traffic server identity into the packet is done by encoding the traffic server identity into bits of the Transmission Control Protocol header reserved for carrying a time stamp value.

Figure 5:
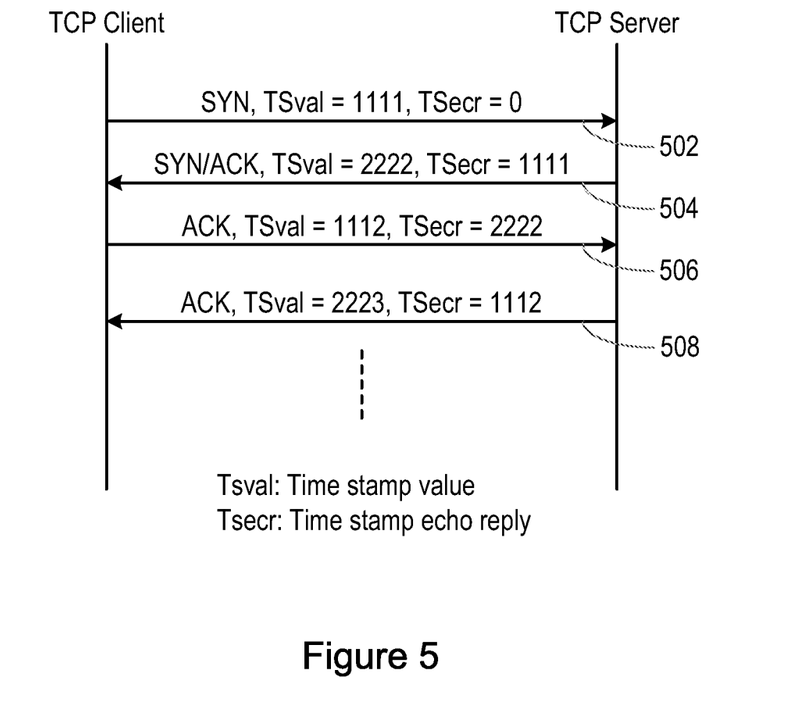
FIG. 5 is a signalling diagram which illustrates a time stamping procedure in a Transmission Control Protocol.

FIG. 5 is a signalling diagram which illustrates the standard time stamping procedure in TCP.

The TCP client sends in step 502 a TCP SYN packet to create a new TCP connection. In this packet the Time Stamp Value (TSval) is carried in the TCP header to the TCP server. In this example, the time stamp value is "1111". The Time Stamp Echo Reply TSecr value is set as zero and sent along with TSval in the TCP header.

The TCP server will save the TSval as a local variant TS.recent and copy TSval as a TSecr in order to acknowledge the time stamp in its reply. The TCP server also includes a new TSval in its response to the TCP client. In this illustration, the new TSval is "2222".

In step 504 the TCP server sends an acknowledgement, ACK, of the SYN request along with the two new TSval and TSecr values.

The TCP client will then save the new TSval as a local value TS.recent and copy the TSval to the TSecr for the next acknowledgment. The new TSval value will be a monotonic increase of the original TSval sent by the TCP client. In this example, the new value is "1112".

In step 506 the TCP client sends an acknowledgment ACK back to the TCP server along with the two new TSval and TSecr values.

The TCP server will check that the received TSval value is a monotonic increase of the saved TS.recent before replacing the local TS.recent value with the new TSval value (i.e. 1112).

The new TSval value will again be copied into the TSecr value and a new time stamp "2223", which is a monotonic increase of the last time stamp produced by the TCP server will be put into TSval.

In step 508 the TCP server sends a further acknowledgement to the client along with the two new TSval and TSecr values.

Again the TCP client will check that the received TSval value is a monotonic increase of the saved TS.recent value.

The process will continue along this pattern for all communications sent between the client and the server.

Thus, for example, a device can compare a received TSecr value with a current system time stamp, in order to determine a round-trip time for messages between that device and another device.

The time stamp values, TSval, TSecr and TS.recent, are stored as a 32 bit long integers. This integer can represent a amount of time passed. For example, in a Linux Operating System, each single bit increase of the time stamp value represents 4 ms. Therefore the time stamp value can run for a total of 198.8 days duration before repeating values.

In typical applications, however, the round trip time between a client and a server is in the order of seconds. Therefore, a number, L, of the higher bits in this 32 bit long integer are in fact unnecessary as the likelihood of a particular session lasting long enough to mean that one of the higher bits will change is very low.

In embodiments of the invention therefore the traffic server identity is encoded into the time stamp value by making use of the L high bits which are, in typical applications, unnecessary.

Figure 6:
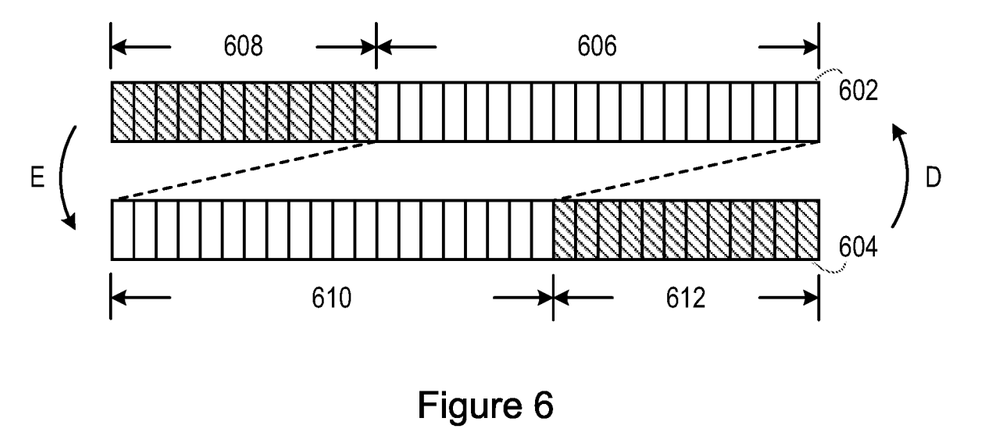
FIG. 6 shows an example of the encoding of a time stamp used in a TCP stack.

FIG. 6 shows an example of the encoding of a time stamp used in a TCP stack.

Specifically, FIG. 6 shows an original time stamp value 602 and an encoded time stamp value 604. An encoding process E converts an original time stamp value 602 to an encoded time stamp value 604, and a decoding process D converts the encoded time stamp value 604 to the original time stamp value 602.

The original time stamp value 602 has a first part 606, which contains the K bits which are sufficient for producing an accurate time stamp during a typical application. The original time stamp value 602 also has a second part 608, which contains the L higher bits which are not required for calculating time values in a typical application. In this illustrated example, this second part 608 is used to encode the traffic server identity.

Thus, each traffic server is given a unique identity value, for example, "1", "2", "3", etc., that can be used to distinguish it from the other traffic servers that are in use in that system at that time. For example, if the system includes up to 16 traffic servers, four bits may be allocated to the second part 608 of the original time stamp value 602, as that will provide the possibility of 16 different traffic server identities.

In order to support the monotonic increase of the overall time stamp, even when the time stamp is wrapped (reset), in the encoding process E, the lower K bits and the higher L bits are swapped over, so that the encoded time stamp value 604 has a first part 610, which contains the K bits representing the actual time stamp, and a second part 612, which contains the encoded traffic server identity. In this case, the L bits representing the encoded traffic server identity are the lower bits of the encoded time stamp value 604. Therefore the least significant bits of the original time stamp 602 are carried in the most significant bits of the encoded time stamp 604, and the least significant bits of the encoded time stamp are reserved for carrying a value identifying the selected traffic server.

Thus, in the process of FIG. 4, when the selected traffic server encodes information identifying the traffic server into the packet in step 408, this may involve inserting the K least significant bits of the current time value into the most significant bits of the bits that are allocated in the TCP header for carrying the time stamp value TSval, and inserting bits representing the identity of the traffic server into the least significant L remaining bits of the bits that are allocated in the TCP header for carrying the time stamp value.

Also, at this stage, the traffic server reads the L most significant bits of the current time value, and stores these as a parameter TShighrecent.

In step 412 of the process shown in FIG. 4, the client is able to act in a conventional manner, as described with reference to FIG. 5. Thus, the client returns as TSecr the value that it received in the bits that are allocated in the TCP header for carrying the time stamp value TSval. Thus, it is not necessary for the client to recognise that some of these bits represent the traffic server identity.

When, in step 414, the load balancer receives a packet containing an encoded traffic server identity, it determines the traffic server identity from the received packet and sends the packet on to the correct traffic server, namely the same traffic server that was selected in step 406. Specifically, it can obtain the traffic server identity by examining the L least significant bits of the TSecr value.

Then, when, in step 416, a load balancing agent in the traffic server receives a packet containing an encoded time stamp value, it reads the L most significant bits of its current time value. If these bits have changed since the parameter TShighrecent was stored, the new value is recorded as a new value for TShighrecent.

The load balancing agent in the traffic server will then decode the received time stamp value. To do this, as shown in FIG. 6, first the K most significant bits of the encoded time stamp value (representing the K least significant bits of the original time value) are put as the K least significant bits of the decoded time stamp value. The value of the parameter TShighrecent is then inserted as the L most significant bits of the decoded time stamp value. This decoded time stamp value is then forwarded on to the TCP stack in the traffic server with the rest of the packet for handling in the usual way.

The TCP stack will therefore be unaware of the encoding and decoding of the time stamp.

The process of steps 408 and 410 will be illustrated with reference to one specific example. It should be noted that the load balancing agent may check both the TSval and TSecr values, but this illustration relates to a new TCP request, and so the TSecr value is zero. In this example, the current time value read by the traffic server is 0x12345678 (in hexadecimal notation, where each character represents four bits of the binary value). Also, in this example, the number of unnecessary high bits, L, is 4.

Since the TSecr value is zero for a new TCP this value within the packet will be forwarded directly onto the TCP stack in the traffic server.

The TCP stack may then respond to the TCP connection request. Before the TCP packet is sent out, the load balancing agent will encode the traffic server identity into the TCP packet header. Using the example above, if the traffic server identity is 3, then the encoded TSval will be 0x23456783. That is, the 28 least significant bits (i.e. 7 hexadecimal characters) of the time value, 2345678, become the 28 most significant bits of the encoded time stamp value, and the traffic server identity, represented by 4 bits (i.e. one hexadecimal character) is used as the 4 least significant bits of the encoded time stamp value.

Figure 7:
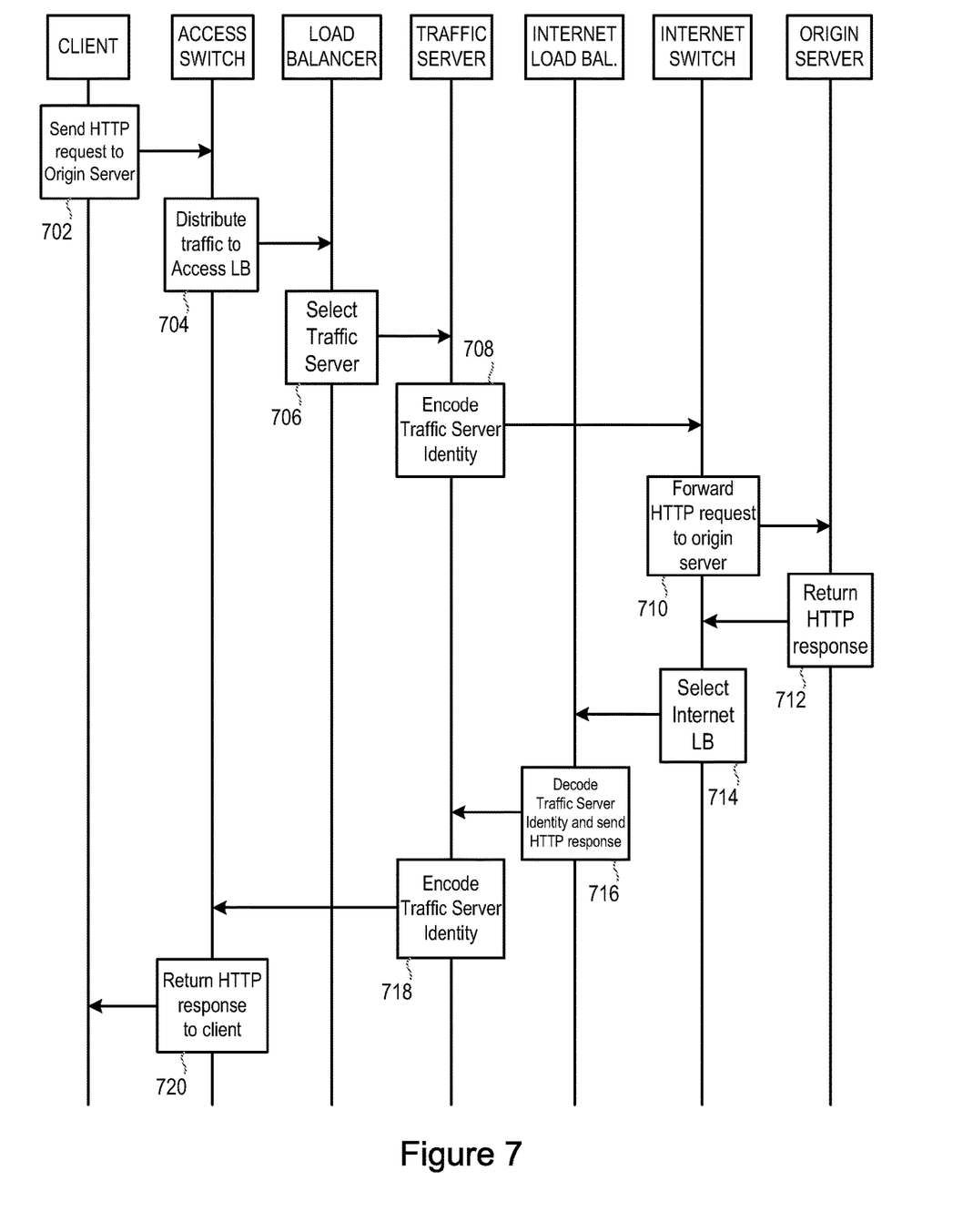
FIG. 7 is a flow chart showing a method according to an embodiment of the invention.

FIG. 7 is a flowchart showing a method according to an embodiment of the invention.

In particular, FIG. 7 shows the end-to-end message sequence for handling the user request, including both the access side and the internet side. Two separate time stamps can therefore be used by the access side load balancing and the Internet side load balancing. However, the in both cases the load balancing agent encodes the same traffic server identity into the time stamps so that requests and responses from either side will be directed towards the same traffic server.

In step 702 the client creates a TCP connection and sends an HTTP request to the origin server. As was described with reference to FIG. 4, this request is first received by the access switch. In step 704 the access switch distributes the traffic to one of the access load balancers for example using Equal Cost Multi-Path (ECMP). The access load balancer receiving the request then determines whether the request is for a new TCP connection and, if so, uses stateless load balancing to select a traffic server in step 706. In some embodiments the stateless load balancing may incorporate using the source port and IP address of the request in a hashtag algorithm to select a traffic server. If the request relates to an existing TCP connection, the access load balancer directs the traffic to the traffic server identified in the packet header, as described elsewhere.

In step 708 the load balancing agent in the selected traffic server encodes the traffic server identity into the request packet. As explained above, this may be done by encoding the traffic server identity into the bits allocated in the TCP header for carrying the time stamp.

The request is then sent on to the Internet access switch which forwards the HTTP request to the origin server in step 710. In previous solutions the entire TCP header needed to be analysed by the load balancer at this stage in order to maintain the same traffic server for the whole TCP session. However, with this solution of including the traffic server identity in the TCP header, there is no need to analyse the TCP header, so the Internet side load balancers can be bypassed at this stage.

The encoded traffic server identity in the protocol header will then be carried by any subsequent protocol packets sent from the client device to the load balancer. The load balancer can detect the encoding of the traffic server identity in the protocol header, and the packet can be forwarded to the correct Traffic Server. In some embodiments, the load balancer may be able to detect the encoding of the traffic server identity by whether or not the low bits of the returned time stamp represent a traffic server identity or not. In other embodiments all TCP traffic is encoded where necessary and, hence, if the packet is not an initial request for a TCP connection, i.e. TSecr is zero, the load balancer will know that the traffic server identity is contained in the returned time stamp.

Having received the request, the origin server will then verify the monotonic increase of TSval., copy the TSval to TSecr and return the HTTP response to the Internet switch in step 712.

The internet switch will then select an Internet load balancer in step 714. In some embodiments this is done by using Equal Cost Multi Path.

The selected Internet load balancer will then decode the TSecr value to determine the traffic server identity, and then forward the HTTP response to the correct traffic server in step 716.

In step 718, the load balancing agent in the traffic server will encode the traffic server identity into the time stamp TSval. The traffic server identity encoded in this step will be the same as the traffic server identity which was encoded in step 708.

The HTTP Response will then be sent to the access switch, bypassing the access side load balancer for the same reasons as described above, and the access switch forwards the HTTP response to the Client in step 720.

Figure 8:
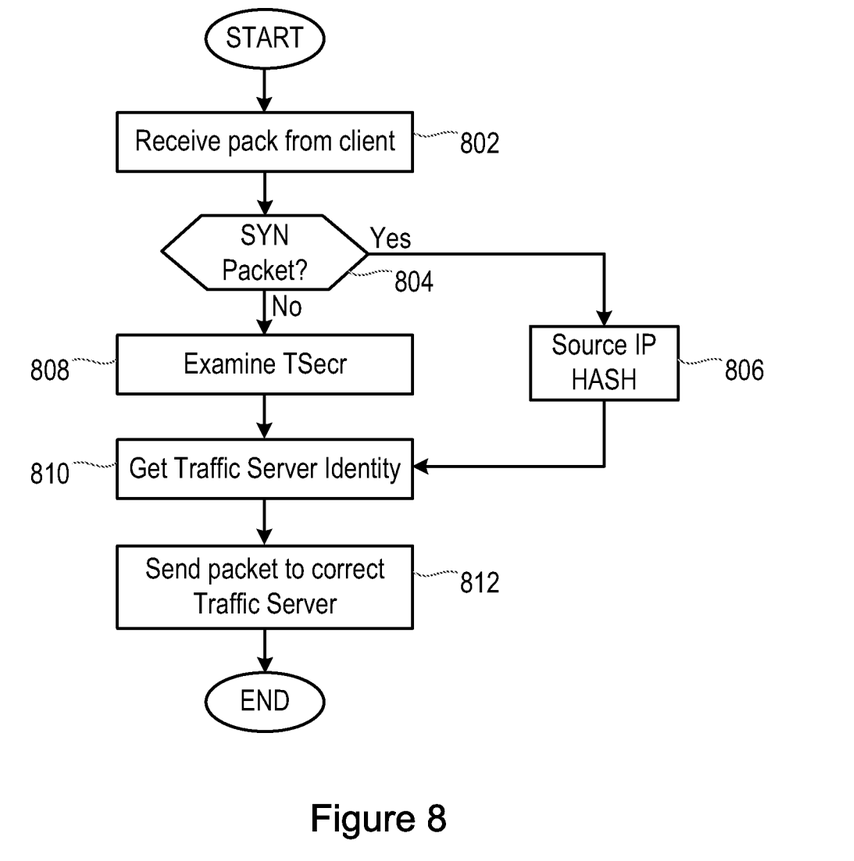
FIG. 8 is a flow chart showing the method carried out in a Load Balancer according to an embodiment of the invention.

FIG. 8 is a flow chart showing the method carried out in a load balancer according to an embodiment of the invention.

In step 802 the load balancer receives a packet from a client. In step 804 the load balancer determines whether the packet is a SYN, i.e. if the request is a request for a new TCP connection. If the packet is a SYN, the method passes to step 806, in which the load balancer performs stateless load balancing to select a traffic server. In this embodiment, the load balancer uses a hashtag algorithm on the Source port and the IP address of the request to select a traffic server. It will be appreciated that other stateless load balancing methods could be used.

If the received packet is determined in step 804 to be a SYN packet, the method passes to step 808 wherein the TSecr is examined.

In step 810 the traffic server identity is retrieved, either by examining the time stamp in step 808 or as a result of the stateless load balancing in step 806. The packet is then sent to the correct traffic server corresponding to the retrieved traffic server identity in step 812.

Figure 9:
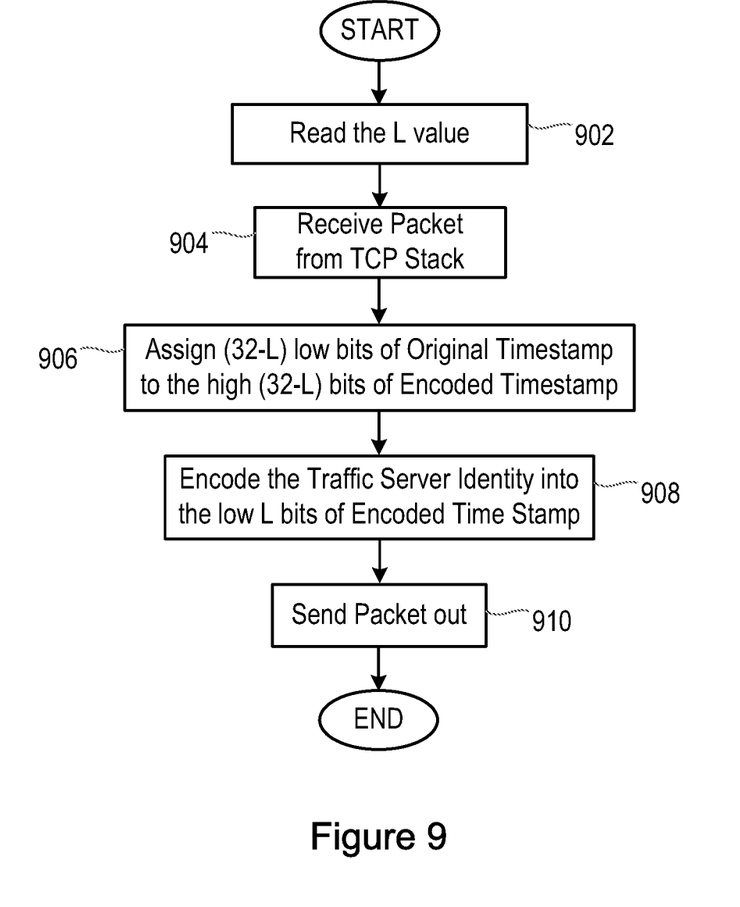
FIG. 9 is a flow chart showing the method for encoding the Traffic Server Identity, as carried out in a Load Balancer Agent according to an embodiment of the invention.

FIG. 9 is a flow chart showing the method for encoding the traffic server identity, as carried out in a load balancer agent associated with a traffic server, according to an embodiment of the invention.

In step 902 the load balancer agent reads the value that has been assigned to the parameter L, that is, the number of bits that are considered unnecessary.

In step 904 the load balancer agent receives a packet from the TCP stack. In step 906 the load balancer agent assigns the K, where K=32−L, lower bits of the original time stamp to the K higher bits of the encoded time stamp.

In step 908 the load balancer agent encodes the traffic server identity into the L lower bits of the encoded time stamp.

Finally, in step 910 the packet is sent out with the encoded time stamp included in the TCP header.

Figure 10:
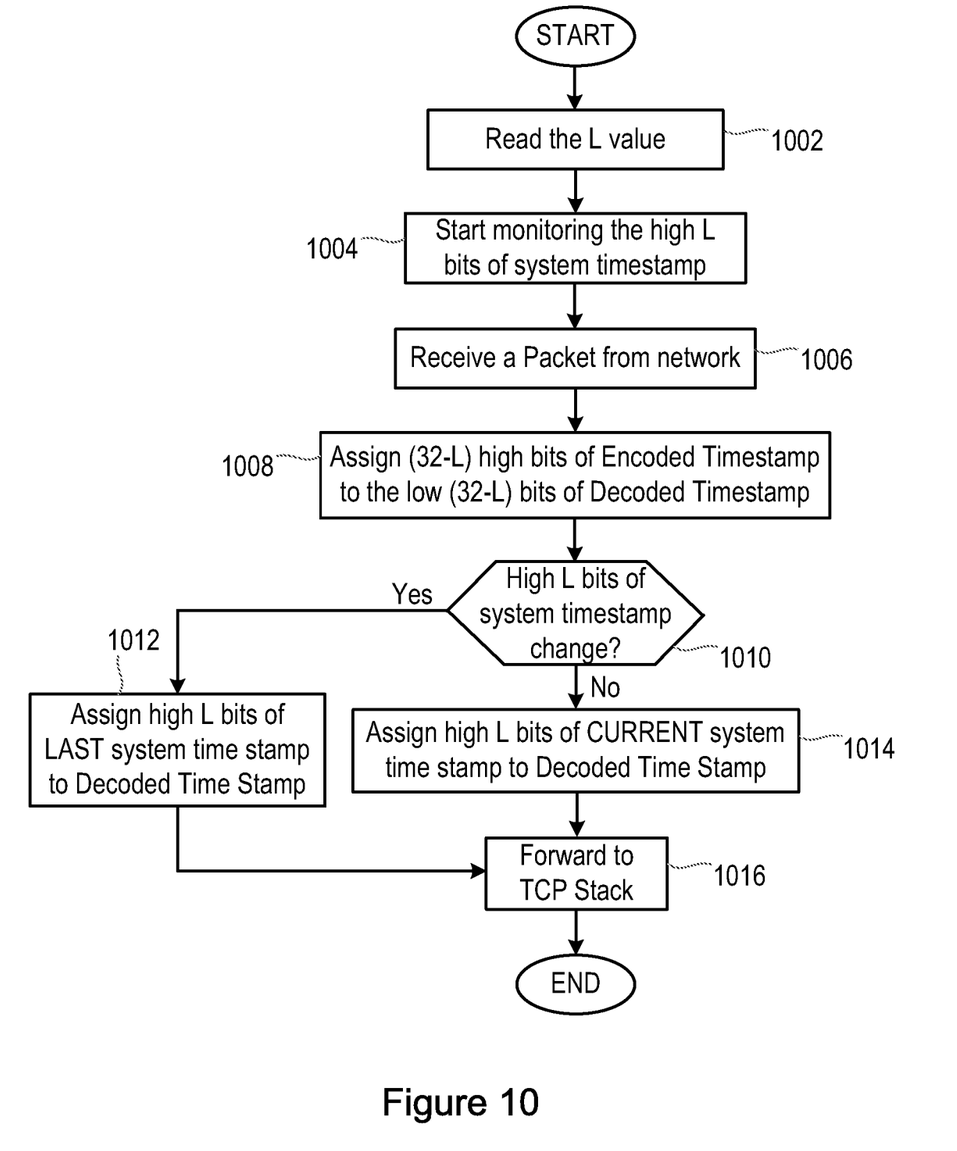
FIG. 10 is a flow chart showing the method for decoding the Traffic Server Identity as carried out in a Load Balancer Agent according to an embodiment of the invention.

FIG. 10 is a flow chart showing the method for decoding the traffic server identity as carried out in a load balancer agent according to an embodiment of the invention.

In step 1002 the load balancer agent reads the value that has been assigned to the parameter L.

The load balancer agent will then continuously monitor the L higher bits of the system time stamp of the traffic server in step 1004.

In step 1006 the load balancer agent receives a packet from the network. In step 1008 the load balancer agent assigns the K high bits of the received TSecr, which will be the encoded time stamp, to the low K bits of the decoded time stamp.

In step 1010 the load balancer agent determines if the L high bits of the system time stamp have changed. This can be done by comparing the L high bits of the current system time stamp to the value of TShighrecent.

If the L high bits of the system time stamp have changed, then the method passes to step 1012 and the value of the TShighrecent is assigned to the L high bits of the decoded timestamp.

If the L high bits of the system time stamp have not changed, then the method passes to step 1014 and the L high bits of the current time stamp are assigned to the L high bits of the decoded time stamp.

After the encoded time stamp is decoded and restored to its original value, and assigned to the value of TSecr, the packet is forwarded to the TCP stack in step 1016.

There is thus described a method and a system for load balancing in a communications network.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of performing load balancing in a communications network comprising a plurality of traffic servers, the method comprising:
   receiving, at a load balancer, a first Transmission Control Protocol (TCP) protocol data unit (PDU), the first TCP PDU comprising information indicating that a client is requesting an establishment of a TCP connection;
   after receiving the first TCP PDU, the load balancer selecting a traffic server;

the load balancer forwarding the received first TCP PDU to the selected traffic server, wherein the forwarded first TCP PDU is identical to the received first TCP PDU;
the traffic server receiving the first TCP PDU transmitted by the load balancer;
the traffic server encoding an identity of the traffic server into a protocol message header;
the traffic server transmitting towards the client device the protocol message header containing the encoded identity of the traffic server;
the client device including the encoded identity of the traffic server in a second TCP PDU and transmitting the second TCP PDU towards the load balancer;
the load balancer receiving the second TCP PDU;
the load balancer obtaining the encoded identity of the traffic server from the received second TCP PDU;
the load balancer forwarding the received second TCP PDU to the traffic server, wherein the forwarded second TCP PDU is identical to the received second TCP PDU; and
the traffic server receiving the second TCP PDU that was forwarded by the load balancer, wherein
the protocol message header is a TCP header,
encoding the identity of the traffic server into the TCP header comprises encoding the identity of the traffic server into bits of the TCP header reserved for carrying a time stamp value comprising least significant bits and most significant bits, and
encoding the identity of the traffic server into the bits of the TCP header reserved for carrying the time stamp value comprises carrying the least significant bits of the time stamp value in bits of the TCP header reserved for carrying the most significant bits of the time stamp value, and carrying a value identifying the traffic server in bits of the TCP header reserved for carrying the least significant bits of the time stamp value.

2. A method, for use in a load balancer of a communications network comprising a plurality of traffic servers, the method comprising:
receiving a first Transmission Control Protocol (TCP) protocol data unit (PDU) generated by a client, the first TCP PDU comprising information indicating that the client is requesting an establishment of a TCP connection;
after receiving the first TCP PDU selecting a traffic server;
forwarding the received first TCP PDU to the selected traffic server, wherein the forwarded TCP PDU is identical to the received first TCP PDU;
receiving a second TCP PDU that was generated by the client, wherein the second TCP PDU comprises a TCP header carrying an encoded identity of the traffic server;
obtaining the encoded identity of the traffic server from the TCP header; and
forwarding the received second TCP PDU to the traffic server as a result of determining that the second TCP PDU contains the encoded identity of the traffic server, wherein the forwarded second TCP PDU is identical to the received second TCP PDU, wherein
obtaining the encoded identity of the traffic server from TCP header comprises obtaining the encoded identity of the traffic server from bits of TCP header reserved for carrying a time stamp value comprising least significant bits and most significant bits,
obtaining the encoded identity of the traffic server from the bits of the TCP header reserved for carrying the time stamp value comprises reading a value identifying the traffic server from bits of the TCP header reserved for carrying the least significant bits of the time stamp value, and
the least significant bits of the time stamp value are carried in the bits of the TCP header reserved for carrying the most significant bits of the time stamp value.

3. A method, the method comprising:
a traffic server receiving a first Transmission Control Protocol (TCP) protocol data unit (PDU) that was transmitted by a client towards an origin server, wherein the first TCP PDU comprises a TCP header comprising: i) a first set of N bits encoding a timestamp, wherein the first set of N bits consists of M least significant bits (LSBs) and L most significant bits (MSBs) and ii) a second set of N bits consisting of L bits that encode a traffic server identifier that identifies the traffic server and M other bits, wherein M+L=N;
the traffic server generating a second TCP PDU that is a modified version of the first TCP PDU, wherein generating the second TCP PDU comprises generating a third set of N bits that consists of i) the L bits of the second set of N bits that encode the traffic server identifier and ii) the M LSBs of the first set of N-bits, wherein the second TCP PDU comprises a TCP header that contains the third set of N bits; and
the traffic server transmitting the second TCP PDU towards the origin server.

4. The method of claim 3, wherein the M MSBs of the third set of N bits is equal to the M LSBs of the first set of N bits and the L LSBs of the third set of N bits is equal to the L bits that encode the traffic server identifier.

5. The method of claim 3, wherein generating the second TCP PDU further comprises generating a fourth set of N bits that consists of said M bits of the second set of N bits and L previously stored bits.

6. The method of claim 5, wherein the L previously stored bits are L MSBs of a timestamp.

7. A load balancer for use in a communications network comprising a plurality of traffic servers, the load balancer comprising:
a receiver configured to receive a first Transmission Control Protocol (TCP) protocol data unit (PDU) generated by a client, the first TCP PDU comprising information indicating that the client is requesting an establishment of a TCP connection;
a transmitter;
a memory; and
a processor coupled to the memory, the receiver, and the transmitter, wherein
the load balancer is configured to:
after receiving the first TCP PDU, select a traffic server;
forward the received first TCP PDU to the selected traffic server, wherein the forwarded TCP PDU is identical to the received first TCP PDU;
receive a second TCP PDU that was generated by the client, wherein the second TCP PDU comprises a TCP header carrying an encoded identity of the traffic server;
obtain the encoded identity of the traffic server from bits of the TCP header reserved for carrying a time stamp value comprising least significant bits and most significant bits; and
forward the received second TCP PDU to the traffic server as a result of determining that the second TCP PDU contains the encoded identity of the traffic server, wherein the forwarded second TCP PDU is identical to the received second TCP PDU, wherein the load balancer is configured to obtain the encoded identity of the traffic server from bits of the TCP header reserved for carrying the least significant bits of the time stamp value, and the least significant bits of the time stamp value are carried in bits of the TCP header reserved for carrying the most significant bits of the time stamp value.

8. A traffic server, the traffic server comprising:

a receiver for receiving a first Transmission Control Protocol (TCP) protocol data unit (PDU) that was transmitted by a client towards an origin server, wherein the first TCP PDU comprises a TCP header comprising: i) a first set of N bits encoding a timestamp, wherein the first set of N bits consists of M least significant bits (LSBs) and L most significant bits (MSBs) and ii) a second set of N bits consisting of L bits that encode a traffic server identifier that identifies the traffic server and M other bits, wherein M+L=N;

a transmitter;

a memory; and a processor coupled to the memory, the receiver, and the transmitter, wherein the traffic server is configured to:

generate a second TCP PDU that is a modified version of the first TCP PDU, wherein generating the second TCP PDU comprises generating a third set of N bits that consists of i) the L bits of the second set of N bits that encode the traffic server identifier and ii) the M LSBs of the first set of N-bits, wherein the second TCP PDU comprises a TCP header that contains the third set of N bits; and transmit the second TCP PDU towards the origin server.

9. The traffic server of claim 8, wherein the traffic server is further adapted to modify the second TCP PDU by removing the encoded identity of the traffic server, thereby restoring an original value of the protocol message header before forwarding the modified second TCP PDU to a destination.

10. The method of claim 3, wherein N is 32 and L is greater than 2.

11. The traffic server of claim 8, wherein N is 32 and L is greater than 2.

* * * * *